United States Patent
Liu et al.

(10) Patent No.: US 6,284,420 B1
(45) Date of Patent: Sep. 4, 2001

(54) TITANYL PHTHALOCYANINE, METHOD FOR PRODUCTION THEREOF AND ELECTROPHOTOGRAPHIC PHOTORECEPTOR CONTAINING THE SAME

(75) Inventors: Jia-Ming Liu; Kuo-Tung Huang; Chiang-Yun Lee; Mei-Tyz Peng, all of Hsinchu; Cheng-Chi Wang, Taichung; Rong-Ming Ke, Tainan, all of (TW)

(73) Assignee: Industrial Technology Research Institute, Tainan (TW)

( * ) Notice: Subject to any disclaimer, the term of this patent is extended or adjusted under 35 U.S.C. 154(b) by 0 days.

(21) Appl. No.: 09/492,872

(22) Filed: Jan. 26, 2000

(51) Int. Cl.$^7$ ............... G03G 15/02; C09B 47/04; C09B 67/04
(52) U.S. Cl. ............... 430/59.5; 540/141; 540/142
(58) Field of Search ............... 430/59.5; 540/141, 540/142

(56) References Cited

U.S. PATENT DOCUMENTS 4,152,171 * 5/1979 Barraclough et al. ............... 540/141
5,595,845 * 1/1997 Maeda et al. ............... 430/59.5

* cited by examiner

Primary Examiner—Mark Chapman
(74) Attorney, Agent, or Firm—W. Wayne Liauh

(57) ABSTRACT

A peroxide-modified titanyl phthalocyanine for use in preparing charge generating layer of a photoreceptor is disclosed. The peroxide-modified titanyl phthalocyanine is obtained by subjecting titanyl phthalocyanine to a peroxide-induced complexation-mediated crystal transformation at a low temperature. The peroxide-modified titanyl phthalocyanine is characterized by having Bragg diffraction angles of 7.3, 9.4, 14.0, 24.1, 25.7, 27.2 and 28.5 degrees, and vibrational absorption resonances at 1486 cm$^{-1}$, 1420 cm$^{-1}$, 1134 cm$^{-1}$, 1078 cm$^{-1}$, 966 cm$^{-1}$, 900 cm$^{-1}$, 762 cm$^{-1}$ and 736 cm$^{-1}$. The photoreceptor exhibits excellent photosensitivity at wavelengths in the near-infrared range and has a unique crystal form, especially the peroxide-modified titanyl phthalocyanine shows a higher distinct absorption peak at the wavelength of 780 nm.

14 Claims, 9 Drawing Sheets

TITANYL PHTHALOCYANINE, METHOD FOR PRODUCTION THEREOF AND ELECTROPHOTOGRAPHIC PHOTORECEPTOR CONTAINING THE SAME

BACKGROUND OF THE INVENTION

1. Field of Invention

This invention generally relates to titanyl phthalocyanine (TiOPC) having a novel crystal structure, a process for producing the titanyl phthalocyanine and an electrophotographic photoreceptor containing the titanyl phthalocyanine. More specifically, the present invention relates to improved organic photoreceptors containing modified titanyl phthalocyanine as the charge generation material for use in electrophotographic devices such as copiers and laser printers.

2. Description of Related Art

Photoreceptor is the main component responsible for the formation of images in electrophotographic processes that take place in copiers and laser printers. There are two main types of photoreceptors: those containing inorganic photoconductive materials and those containing organic photoconductive materials. Inorganic photoconductive materials, such as selenium, silicon, and mixtures of arsenic and selenium, have been developed and used as photoreceptors in electrophotography. Although appreciable sensitivity and long life can be achieved, the inorganic photoconductive materials suffer from several major drawbacks, such as toxicity and high cost of production. Organic photoconductive materials, on the other hand, offer many attractive features that includes nontoxicity, relatively low cost, low pollution, broad spectral response ranging from visible to infrared light, and flexible choice for use. Stringent requirements are imposed on the photoconductive as well as mechanical properties of electrophotographic photoreceptors. Suitable candidate materials for use as photoreceptors are required to exhibit, not only efficient charge generation and charge transport properties, but also structural integrity and robustness so as to withstand mechanical abrasion during image development cycles. Most commercial copiers and laser printers nowadays have used function-separated photoreceptors to achieve the various requirements. General structures of photoreceptors include an aluminum substrate and sequentially forming an undercoating layer, a charge generation layer and a charge transport layer thereon by dip coating. Organic compounds such as azo, bisazo and perylene pigments are usually chosen as the charge generation material for photoreceptors that are sensitive to visible light. For printers that utilize semiconductor laser (LD) or light-emitting diodes (LED) as the light source, photoreceptors are required to be photosensitive to near-infrared beam in the wavelength ranges of 750 nm to 850 nm, particularly in the main peak wavelength of 780 nm. In this category, metal-free phthalocyanines, metallophthalocyanines and squrayliums have been found to exhibit substantial photosensitivity in the near-infrared ranges.

Among the infrared-sensitive organic materials, titanyl phthalocyanines are especially of interest because of their high efficiency of charge generation. The structure of titanyl phthalocyanine is shown in FIG. 1. There are many conventional technologies and prior art patents disclosed to develop methods that can cost-effectively mass produce the highly infrared-sensitive titanyl phthalocyanine, with consistent and further improved quality, for use as efficient electrophotographic photoreceptors. The efficiency of charge generation of titanyl phthalocyanine was found to be strongly dependent on its crystal structure. Most of the reported methods for modifying the crystal structure of titanyl phthalocyanines involve an initial acid-pasting treatment step, in which strong protonic acids such as sulfuric acid are used to dissolve the titanyl phthalocyanine material, and the resultant solution was subsequently precipitated in a nonsolvent such as water, to obtain amorphous powder of titanyl phthalocyanine. Another method for modifying the crystal structure of titanyl phthalocyanines utilizes the ball milling of the dry titanyl phthalocyanine material; this method was shown to have the same effect to obtain the amorphous phase titanyl phthalocyanine.

The essence of the methods reported in the art for the modification of the crystal structure of titanyl phthalocyanine lies in the subsequent solvent treatment of the amorphous titanyl phthalocyanine. Effective organic solvents include chlorobenzene, dichlorobenzene and dichloroethane, or ethers such as n-butyl ether and ethylene glycol n-butyl ether. In U.S. Pat. No. 5,059,355, it was disclosed a process for the preparation of crystalline titanyl phthalocyanine showing distinct diffraction peaks at Bragg angles ($2\theta \pm 0.2°$) of 9.3, 10.6, 13.2, 15.1, 15.7, 16.1,20.8, 23.3 and 26.3 degrees in the X-ray diffraction spectrum, which includes mechanically pulverizing titanyl phthalocyanine, dispersing it in water to form a suspension, adding an organic solvent into the suspension and heating the suspension. In U.S. Pat. No. 5, 132, 197, it was disclosed that highly photoconductive titanyl phthalocyanine having Bragg diffraction angles of 9.0, 14.2, 23.9 and 27.1 degrees can be produced by acid-pasting treatment to obtain amorphous titanyl phthalocyanine, then by treatment with methanol to obtain low crystalline titanyl phthalocyanine, followed by a wet milling in n-butyl ether or pinene or ethylene glycol n-butyl ether. The importance of the presence of water during the modification of crystal forms of titanyl phthalocyanine was further addressed in U.S. Pat. No. 5,298,617. It was found ammonia has the same effect as water that their molecules might have actually become associated with titanyl phthalocyanine after the treatment processes disclosed in U.S. Pat. No. 5,567,559. The ammonia-modified titanyl phthalocyanine has Bragg diffraction angles of 7.5, 9.5, 13.6, 14.3, 17.9, 24.0, 27.2 and 29.1 degrees.

Although highly photoconductive titanyl phthalocyanines have been reported in the art, the mechanism of crystal transformation and the role of different solvent media remained unclear in the above-mentioned prior art disclosures. Furthermore, the possibility of water doping on the titanyl phthalocyanine molecule cannot be neglected. It was also shown in many reports that the electric conductivity of titanyl phthalocyanine and other related phthalocyanines has increased after treatment with water since water, like oxygen, can oxidize the titanyl phthalocyanine material. Therefore, it can be expected that the dark decay may become a serious problem when water-treated titanyl phthalocyanine is used as the charge generation component of the photoreceptor. The adverse effect of substantial dark decay associated with the titanyl phthalocyanine produced by the prior art processes will cause undesirable foggy images to be produced in the printed copies. On the other hand, the prior art titanyl phthalocyanines generally show a higher distinct absorption peak which appears at the wavelength of 800 nm to 820 nm and a lower one around the main peak wavelength of 780 nm for the light source.

SUMMARY OF INVENTION

Therefore, one of the objects of the present invention is to provide a titanyl phthalocyanine having a novel crystal structure.

One of other objects of the present invention is to provide a process for fabricating the above-mentioned crystal structure of titanyl phthalocyanine.

Another object of the present invention is to provide an electrophotographic photoreceptor which contains the above-mentioned crystal structure of titanyl phthalocyanine which exhibits a good photosensitivity in the near-infrared ranges, especially shows a higher distinct absorption peak at the wavelength of 780 nm.

Accordingly, the new form of titanyl phthalocyanine provided is characterized by main peaks specified by Bragg angles ($2\theta \pm 0.2°$) of 7.3 degrees, 9.4 degrees, 14.0 degrees, 24.1 degrees, 25.7 degrees, 27.2 degrees and 28.5 degrees in X-ray diffraction pattern based on CuK.alpha. characteristic X-rays.

The method for fabricating the new form of titanyl phthalocyanine includes the step of subjecting a low crystalline titanyl phthalocyanine treated by methanol to a hydrogen peroxide solution, such as an anhydrous hydrogen peroxide solution, mixing with an organic solvent selected from chlorobenzene, n-butyl ether or butane so as to induce a crystal transformation of the titanyl phthalocyanine.

Meanwhile, the photoreceptor for use in electrophotographic processes includes a charge generation layer and a charge transporting layer, wherein the charge generating layer contains the new form of titanyl phthalocyanine which is obtained by a process including: (a) preparing a mixture of a hydrogen peroxide solution with a organic solvent; and (b) subjecting titanyl phthalocyanine to a peroxide-induced complexation-mediated crystal transformation so as to obtained a peroxide-modified titanyl phthalocyanine.

The new form of titanyl phthalocyanine is further characterized in having vibrational absorption resonances at: 1486 $cm^{-1}$, 1420 $cm^{-1}$, 1134 $cm^{-1}$, 1078 $cm^{-1}$, 966 $cm^{-1}$, 900 $cm^{-1}$, 762 $cm^{-1}$ and 736 $cm^{-1}$ in spectra pattern based on Fourier transform infrared (FTIR) spectroscopy.

The process for fabricating the new form of titanyl phthalocyanine further includes: (1) mechanically pulverizing amorphous titanyl phthalocyanine; (b) obtaining a low crystalline titanyl phthalocyanine by treating the amorphous titanyl phthalocyanine with methanol; (c) preparing a mixture of a hydrogen peroxide solution with a organic solvent; and (d) dispersing the low crystalline titanyl phthalocyanine in the mixture to form the peroxide-modified titanyl phthalocyanine. As such, the peroxide-modified titanyl phthalocyanine is formed at the condition of a processing temperature between $-20°$ C. and a room temperature, preferably between $-10°$ C. and $0°$ C., and of processing time between 4 and 24 hours, preferably between 5 and 10 hours. The anhydrous hydrogen peroxide solution can be prepared by extracting, separating and desiccating from the mixture of the hydrogen peroxide solution and the organic solvent. There are a concentration of the anhydrous hydrogen peroxide solution and the titanyl phthalocyanine provided in a mole ratio from 1:1 to 1:100, preferably from 1:10 to 1:100, and the organic solvent and the crystalline titanyl phthalocyanine provided in a weight ratio from 1:1 to 50:1, preferably from 2:1 to 10:1.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein.

DETAIL DESCRIPTION OF THE INVENTION

The present invention provides an economic and easy-fabricating method for producing highly photoconductive titanyl phthalocyanines. However, unlike the prior art processes, which involve the treatment with water or involves the association of ammonia with titanyl phthalocyanine, in the present invention, the hydrogen peroxide is used to induce the transformation of crystal forms during the interaction between titanyl phthalocyanine and the solvent medium in which the titanyl phthalocyanine is dissolved. As a result, a new structure of titanyl phthalocyanine is obtained with Bragg diffraction angles ($2\theta \pm 0.2°$) of 7.3 degrees, 9.4 degrees, 14.0 degrees, 24.1 degrees, 25.7 degrees, 27.2 degrees and 28.5 degrees. More importantly, the minority of hydrogen peroxide molecules among the crystalline titanyl phthalocyanine will generate hydrogen and oxygen free radicals to provide meta-stable function within the crystal structure. Thus, the transfer of resonance energy level for the titanyl phthalocyanine occurs, and the titanyl phthalocyanine can show a higher distinct absorption peak in the near-infrared ranges, especially at the wavelength of 780 nm.

Figure 1:
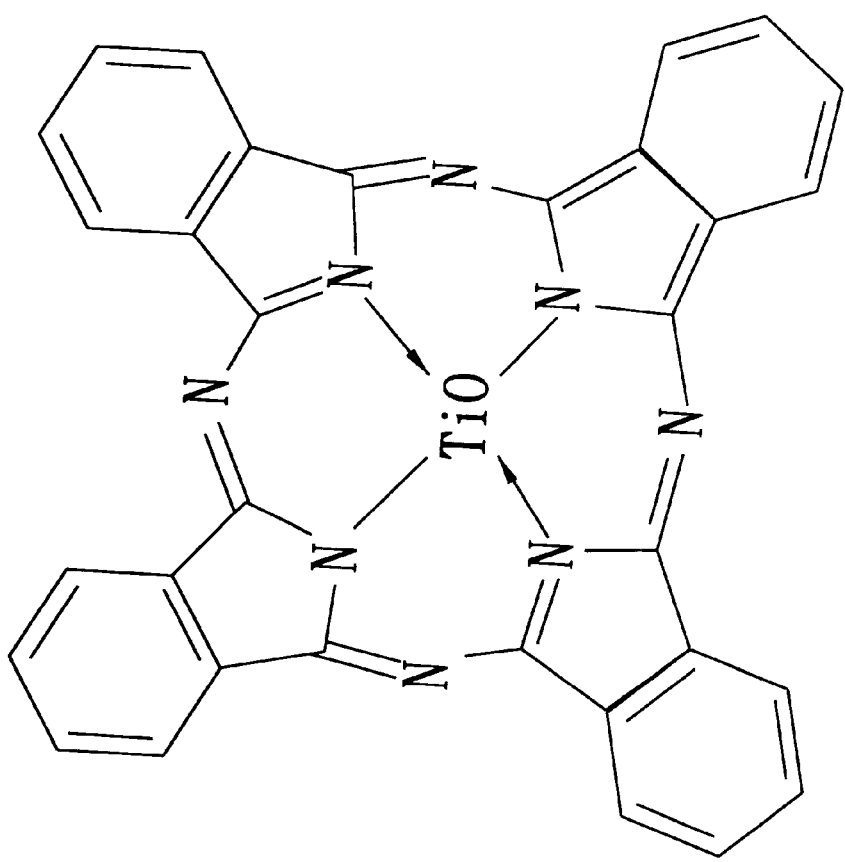
FIG. 1 shows the structure of titanyl phthalocyanine.
Figure 2:
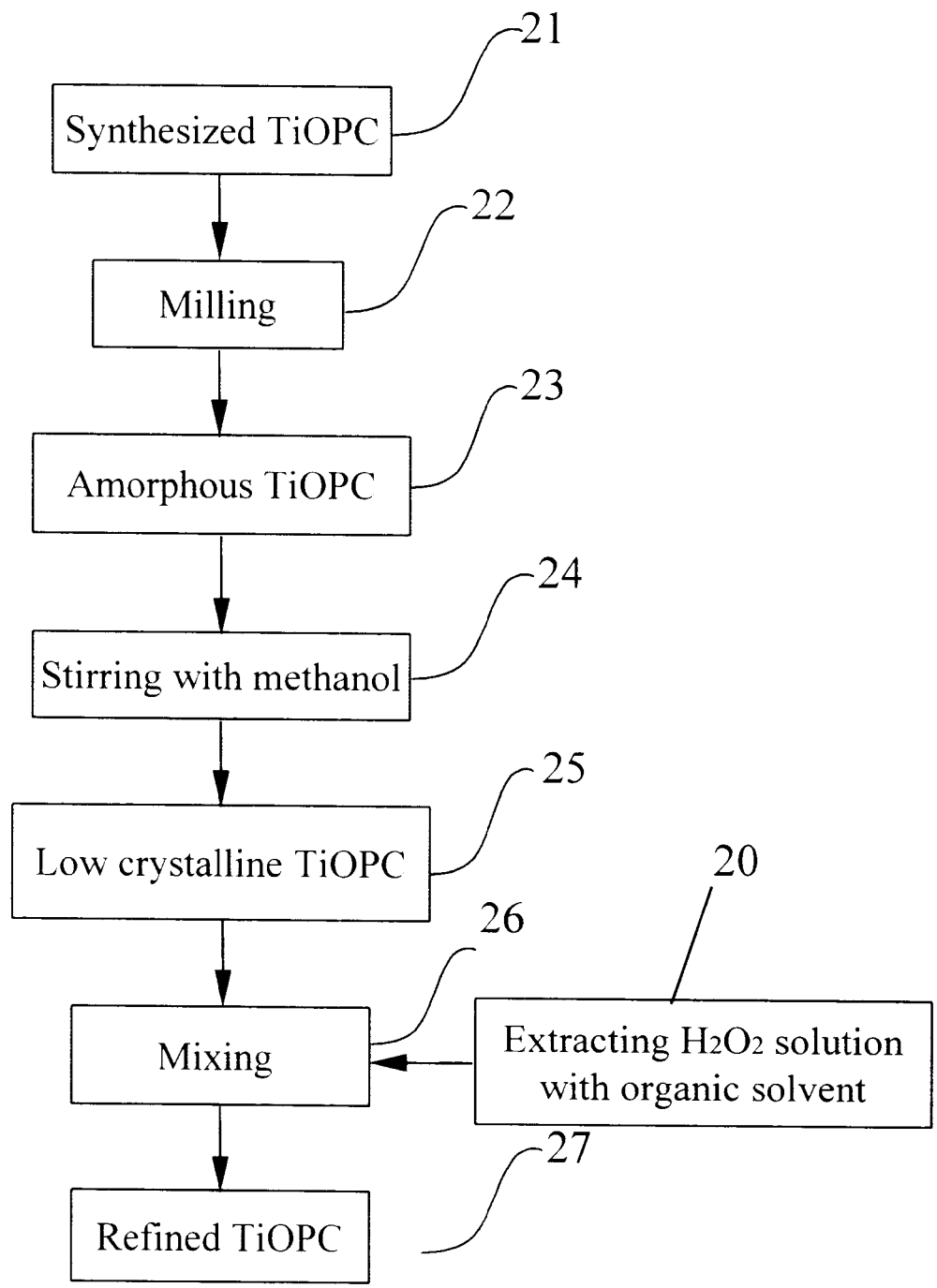
FIG. 2 is a block diagram of the steps for producing the titanyl phthalocyanine of the invention.

The transformation of the crystal structure of titanyl phthalocyanine is performed by our novel processing method as depicted in FIG. 2. First, the synthesized refinement of titanyl phthalocyanine (as provided in step 21) is pulverized to a ball mill containing agate beads therein having the size (diameter) of about 10 mm for 6 days at a room temperature (as in step 22) to obtain amorphous titanyl phthalocyanine (as in step 23). The amorphous titanyl phthalocyanine is then treated by milling with methanol (as in step 24) to obtain low crystalline titanyl phthalocyanine (as in step 25). Second, the hydrogen peroxide solution is prepared by extraction to mix with an organic solvent such as chlorobenzene, n-butyl ether or butane (as in step 20). The low crystalline titanyl phthalocyanine is then dispersed in the extracting hydrogen peroxide solution at a lower temperature for being mechanically well stirred (as in step 26) so as to trigger a fully uniform interaction between titanyl phthalocyanine and hydrogen peroxide. There are a concentration of the hydrogen peroxide solution and the titanyl phthalocyanine provided in a mole ratio from 1:1 to 1:100, preferably from 1:10 to 1:100, and the organic solvent and the crystalline titanyl phthalocyanine provided in a weight ratio from 1:1 to 50:1, preferably from 2:1 to 10:1. As such, a peroxide-modified titanyl phthalocyanine is formed (as in step 27) at the condition of a processing temperature between −20° C. and a room temperature, preferably between −10° C. and 0° C., and of processing time between 4 and 24 hours, preferably between 5 and 10 hours.

Figure 3:
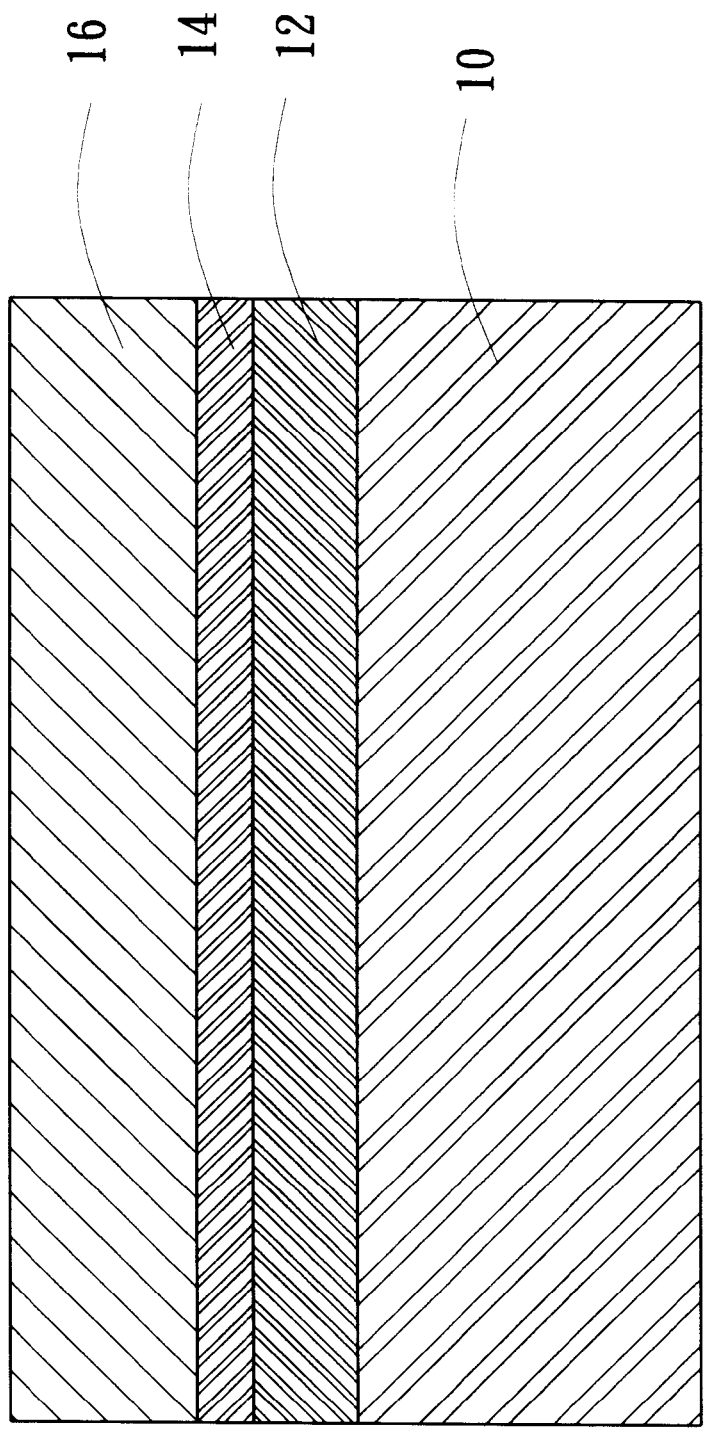
FIG. 3 is a schematic diagram of an electrophotographic photoreceptor containing the titanyl phthalocyanine of the invention.
Figure 4:
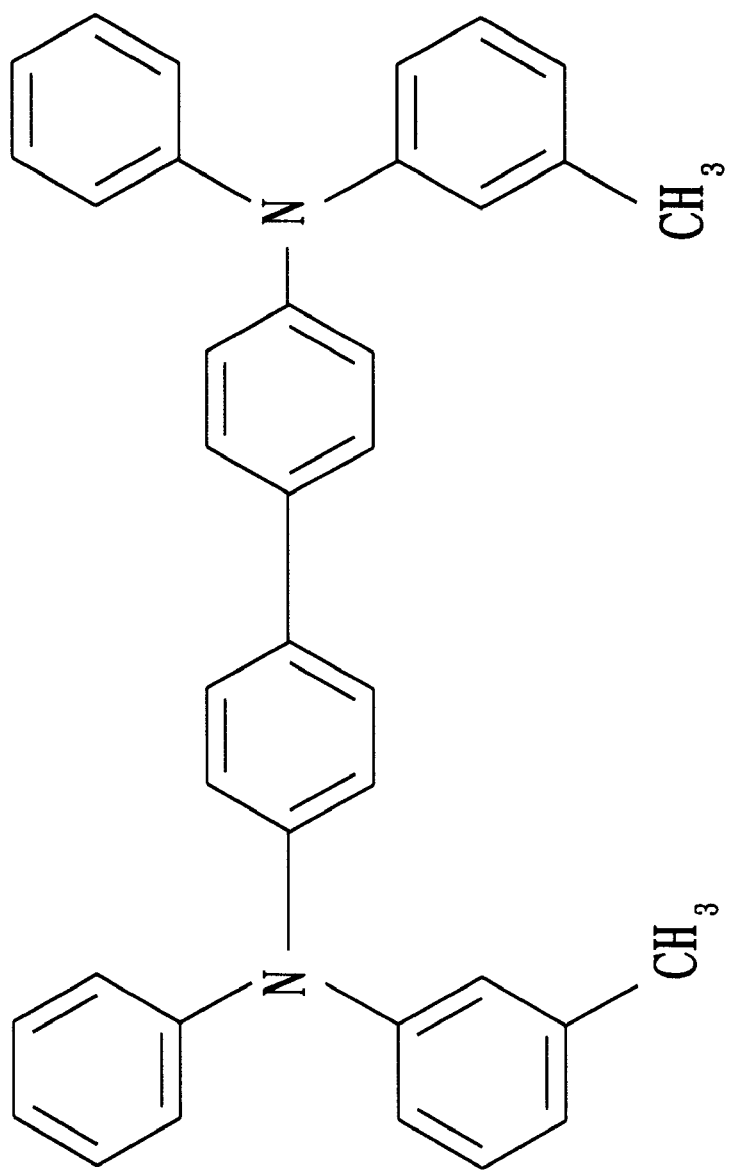
FIG. 4 shows the structure of a charge transporting material, triphenyldiamine (ST 16/1)
Figure 5:
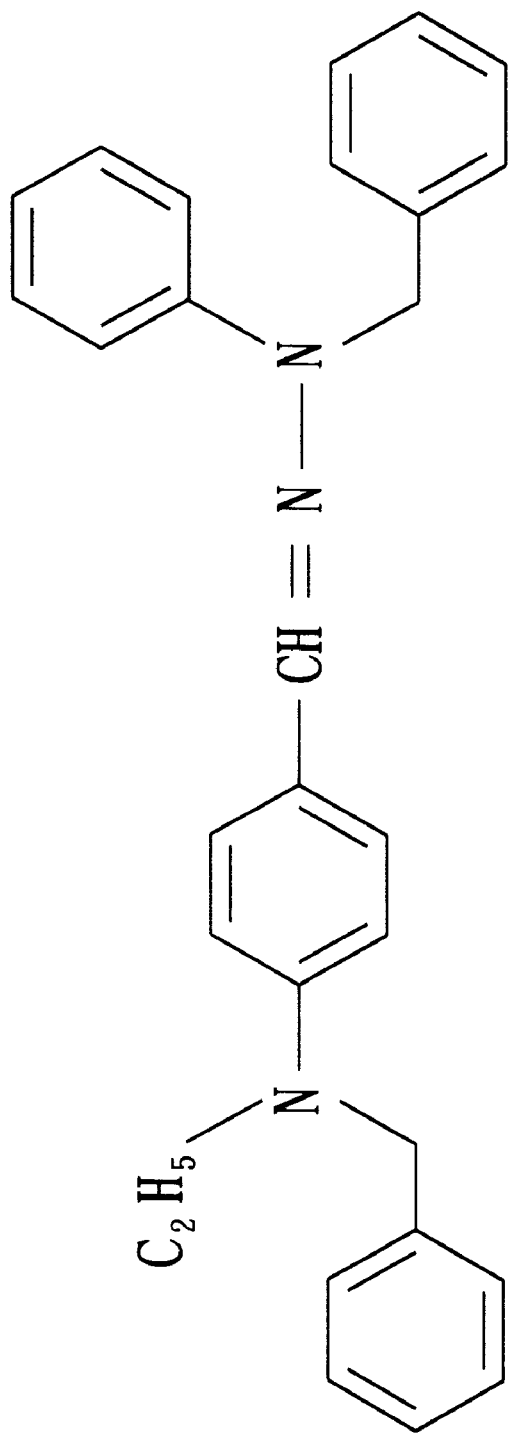
FIG. 5 shows the structure of another charge transporting material hydrazone.

In the preparation of electrophotographic photoreceptors, as shown in FIG. 3, a underlying layer 12, a charge generation layer 14 and a charge transporting layer 16 are formed consecutively on the substrate 10 of outer surface of a aluminum drum by dip coating of solution of respective materials in appropriate organic solvents. A polyvinyl or copolyamide such as trade name CM-8000 (fabricated by Toray Corp.) is used as the material for the underlying layer 12 to achieve good adhesion between the organic charge generation layer 14 and the conducting substrate 10. The thickness of the underlying layer 12 is fixed in the range of 0.5 .mu. m to 5 .mu. m, and preferably between 1 .mu. m and 2 .mu. m. For optimum performance, 5 parts by weight of peroxide-modified titanyl phthalocyanine, 5 parts by weight of polyvinyl butyral such as trade name BM-2 (fabricated by ZeSei HwaSei), 100 parts by weight of cyclohaxanone and 150 parts by weight of methylethyl ketone are used to prepare the coating solution for making the charge generation layer 14. The thickness of the charge generation layer 14 is maintained in the range between 0.1 .mu. m and 2 .mu. m, and preferably between 0.2 .mu. m and 1 .mu. m. In the charge transporting layer 16, which contains resin and charge transporting material, a polycarbonate, trade name PCZ-300 (fabricated by Mitsubishi Corp.) is used as the resin, and a triphenyldiamine, trade name ST 16/1 (fabricated by SYNTEC), whose structure is shown in FIG. 4, is used as the charge transporting material. Other effective charge transporting materials can also be used such as a hydrazone shown in FIG. 5. The charge transporting layer 16 is coated with a solution containing the polycarbonate and the charge transporting material in a weight ratio from 3:1 to 1:3, preferably from 2:1 to 1:2, dissolved in any one of toluene, tetrahydrofuran (THF), chlorobenzene and chloroalkane, or a mixture solvent selected from any combination thereof. The thickness of the charge transporting layer 16 is controlled in the range between 15 .mu. m and 20 .mu. m, and preferably between 18 .um. and 25 .mu. m.

A typical process for producing the peroxide-modified titanyl phthalocyanine is as follow.

Initially, a dichlorotianium phthalocyanine is produced by the reaction of titanium tetrachloride among alpha-chloronaphthalene and ortho-phthalodinitrile, followed by successive washing of chloronaphthalene, chlorobenzene, dimethylformamide, dichloro benzene or N-methylpyrrolidone, further washing of methanol or ethanol and then dried. Next, a crystalline titanyl phthalocyanine is obtained by hot water hydrolyzing dichlorotianium phthalocyanine, also followed by successive washing of methanol and aqua pura, and then dried to obtain titanyl phthalocyanine powder. Finally, the refined titanyl phthalocyanine can be afforded by following the steps as shown in FIG. 2. First, the as-synthesized product is mechanically pulverized by the ball mill to obtain amorphous titanyl phthalocyanine. The amorphous titanyl phthalocyanine is then treated with methanol to obtain low crystalline titanyl phthalocyanine and dried at a lower pressure. Next, the hydrogen peroxide solution is extracted to mix with the organic solvent such as chlorobenzene, n-butyl ether or butane. The low crystalline titanyl phthalocyanine is then dispersed in the extracting hydrogen peroxide solution at a lower temperature and after 6 hours stirring, followed by filtration and successive washing of methylethyl ketone and aqua pura, and then dried at a lower pressure. The crystal structure of the refined titanyl phthalocyanine can be verified by X-ray powder diffraction (XRPD). XRPD is performed at a room temperature in a 2 θrange of 5 degrees (starting angle) to 50 degrees (stopping angle) with a Philips PW 1700 X-ray diffractometer using Cu as x-ray target and having 0.02 deg./sec of scanning speed and 40 mA of tube current.

Furthermore, Fourier transform infrared (FTIR) spectra of the refined titanyl phthalocyanine are taken at a room temperature with a Jasco-5300 spectrometer. Samples are in the form of KBr pellets.

The refined titanyl phthalocyanine obtained above is milled along with cyclohexanone solution, and adding polyvinyl butyral solution for stable dispersion of titanyl phthalocyanine. The solution is further diluted with methylethyl ketone to complete the preparation of a coating solution for preparing the charge generation layer of the photoreceptor. The coating solution can be verified by spreading on a glass substrate, followed by drying for optical absorption measurement, or by being deposited for a week to observe whether has precipitate and remains stable. On the other hand, the photoreceptor can be monitored the photosensitivity characterized with a photo-induced discharge curve (PIDC) and other electrophotographic properties by a photoconductive measuring device (trade name PDT-2000L, manufactured by QEA Inc.). The photoreceptor containing the refined titanyl phthalocyanine as the charge generation material can be used in electrophotographic devices such as copiers and laser printers.

There are examples for preferred embodiment of the present invention and comparative examples illustrated below to clarify the present invention is the result of many years of dedicated research efforts by the co-inventors.

Example of Material Preparation

To a 1 liter four-neck jar fitted with mechanical stirrer, condenser, temperature controller and nitrogen tube is added 500 milliliter alpha-chloronaphthalene and ortho-phthalodinitrile (150 g, 1.172 mol.). The mixture is well stirred and then titanium tetrachloride (52.6 g, 0.278 mol.) is added under nitrogen atmosphere. Thereat, the reaction mixture is heated slowly to 200 to 220° C. and maintained at that temperature range for 5 hrs to complete the reaction. The mixture is left to cool to 80° C. after the reaction is finished and then is filtered to collect the precipitate for being washed and cleaned by dimethylfornamide (3 .times. 800 millimeter) and hot methanol (2 .time. 800 millimeter). After stirring the resulting product of dichlorotianium phthalocyanine with hot aqua pura to process hydrolysis (about 5 hrs), it is followed by washing of hot methanol (2 .times. 800 millimeter) and hot water (3 .times.). Dark-blue powder of titanyl phthalocyanine is afforded by filtering before drying under vacuum overnight. The composition of titanyl phthalocyanine is determined by elemental analysis, and the result is shown as follows:

|  | C % | H % | N % |
|---|---|---|---|
| calculated | 66.68 | 2.80 | 19.44 |
| found | 65.69 | 2.78 | 19.17 |

The close agreement between the calculated and found compositions indicates high purity of the synthesized titanyl phthalocyanine.

The transformation of the crystal form of titanyl phthalocyanine is proceeded according to the steps depicted in FIG. 2. In the beginning, the synthesized refinement of titanyl phthalocyanine is mechanically pulverized by agate beads of about 1 cm diameter for 6 days to obtain amorphous titanyl phthalocyanine. The amorphous titanyl phthalocyanine is then treated with methanol, followed by filtration and further dried at 80° C. under vacuum for 12 hrs. The treated product of low titanyl phthalocyanine is left for use in the next stage of production.

Example 1 for the Preparation of Anhydrous Hydrogen Peroxide

Although anhydrous hydrogen peroxide material can be prepared by distillation, followed by desiccation, it is easy to have an explosion during the production. Therefore, the present invention utilizes a more moderate and safer extraction technique to obtain the anhydrous hydrogen peroxide. To a 500 millimeter separation funnel contained 100 millimeter of 30% hydrogen peroxide solution is added 300 millimeter chlorobenzene for completely mixing at a room temperature and then is left to separate. The upper organic extracting phase is detached to a flask, followed by adding 20 g molecular sifter and then left for one day. The final concentration of anhydrous hydrogen peroxide solution is determined as 0.0055 mol./L by titration with 0.1 N $KMnO_4$.

Example 2 for the Preparation of Anhydrous Hydrogen Peroxide

Higher concentration of anhydrous hydrogen peroxide solution can be afforded in a similar way according to the above-mentioned procedure. However, 15 millimeter of 10% sulfuric acid solution is added during the extraction. After extracting, separating and desiccating from the mixture of hydrogen peroxide solution and the organic solvent, the final concentration of anhydrous hydrogen peroxide solution is determined as 0.016 mol./L by titration with 0.1 N $KMnO_4$.

EXAMPLE 1

To a 500 millimeter reactor container with divided chambers is added 250 millimeter anhydrous hydrogen peroxide and chlorobenzene solution prepared by Example 1, followed by mechanically stirring and then refrigerated remaining at −10° C. in one chamber. Next, the low crystalline titanyl phthalocyanine treated by methanol is gradually added in a mole ratio of hydrogen peroxide to titanyl phthalocyanine controlled as 1:25, followed by successively stirring for 5 hrs, and then filtered for washing by chlorobenzene twice. refined titanyl phthalocyanine.

Figure 6:
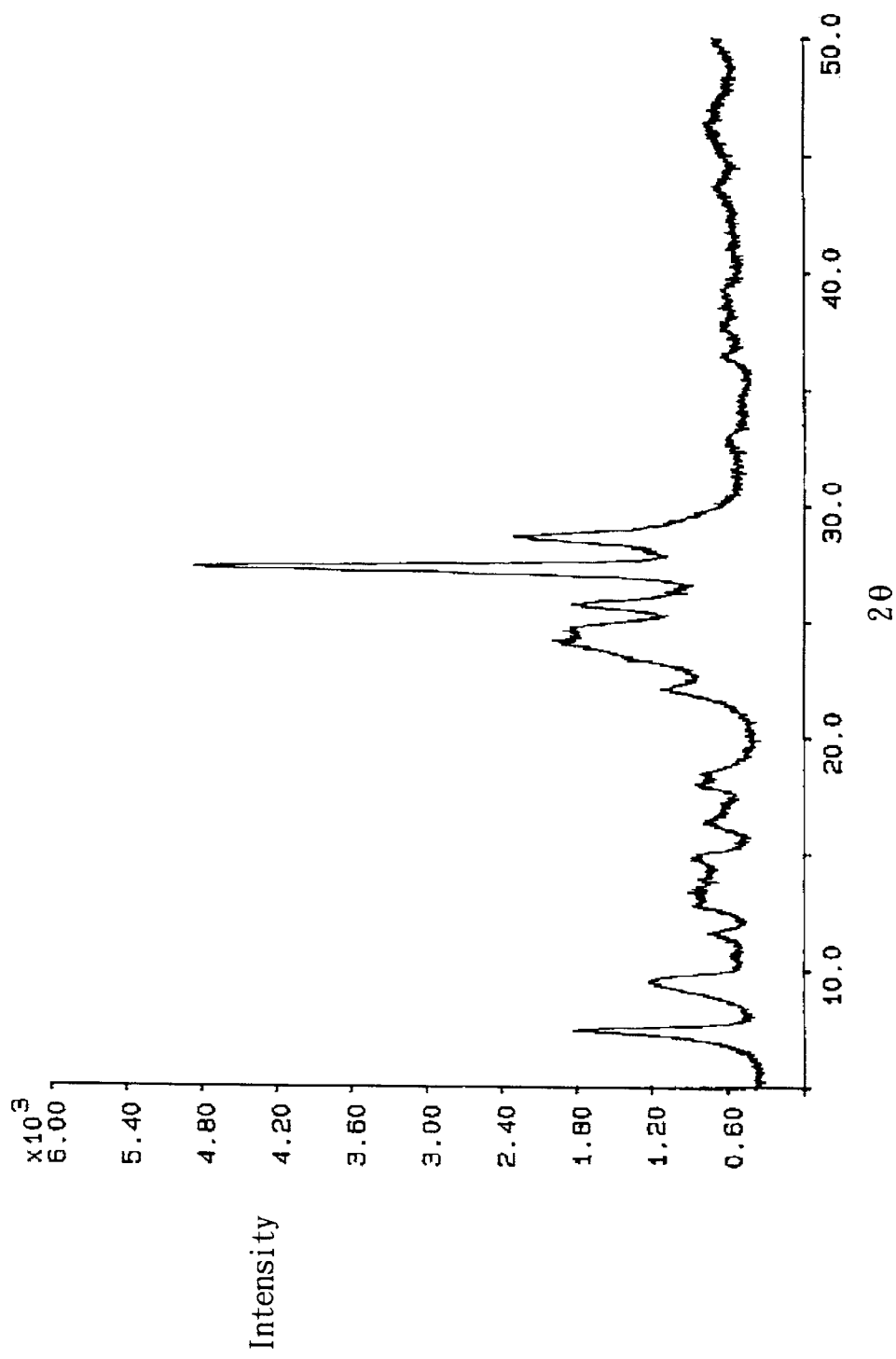
FIG. 6 is an X-ray diffraction pattern obtained from the refined titanyl phthalocyanine from Example 1.
Figure 8:
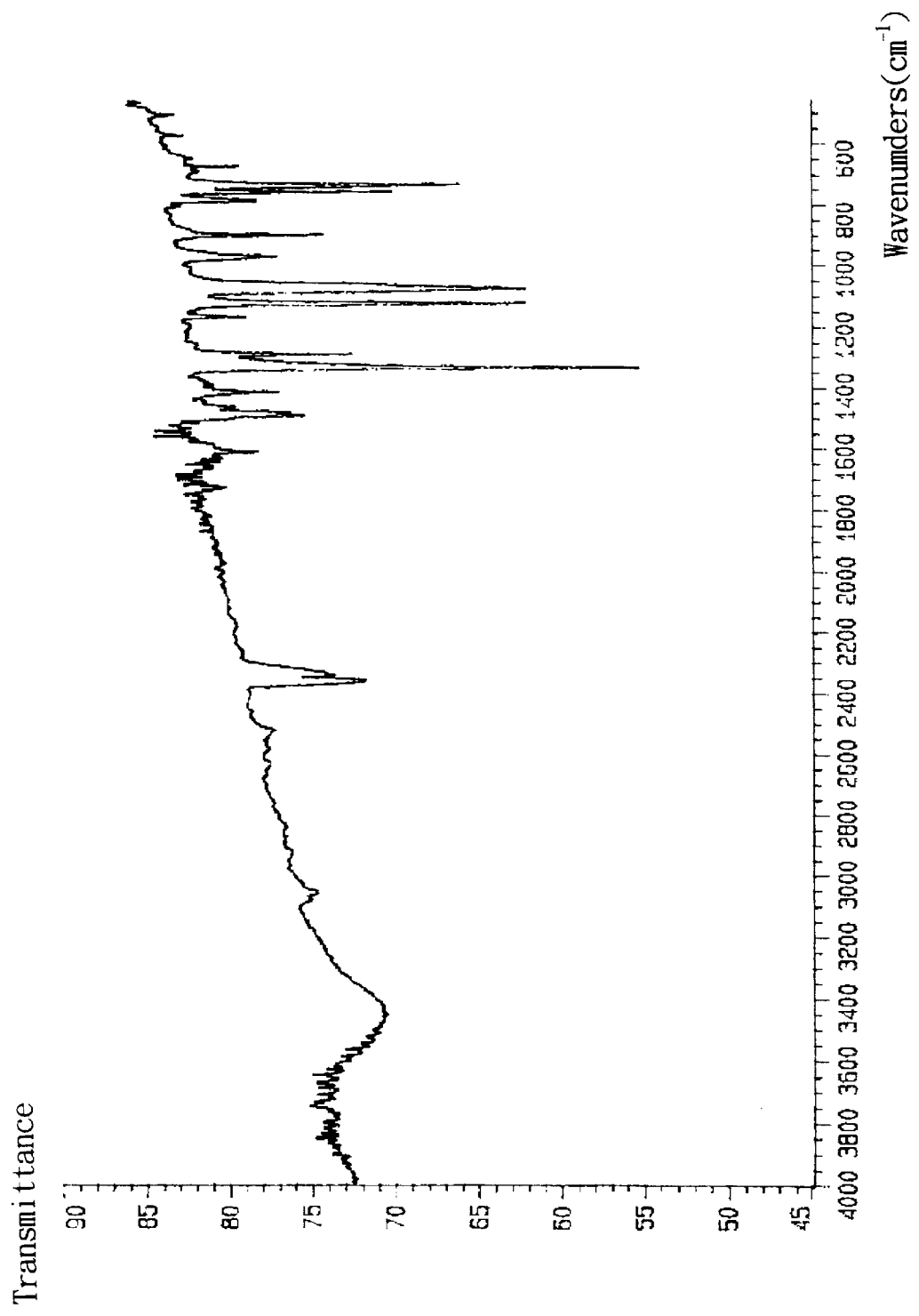
FIG. 8 is an FTIR spectrum for a KBr pellet obtained from the refined titanyl phthalocyanine from Example 1.

FIG. 6 shows the X-ray diffraction pattern of the refined titanyl phthalocyanine which has Bragg diffraction angles ($2\theta \pm 0.2°$) of 7.3, 9.4, 14.0, 24.1, 25.7, 27.2 and 28.5 degrees. The XRPD pattern represents a unique crystal form compared to those disclosed in the various prior art patent documents such as U.S. Pat. No. 5,298,617 or U.S. Pat. No. 5,567,559. The FTIR spectrum of the refined titanyl phthalocyanine is shown in FIG. 8, which indicates vibrational absorption resonances at 1486 cm$^{-1}$, 1420 cm$^{-1}$, 1134 cm$^{-1}$, 1078 cm$^{-1}$, 966 cm$^{-1}$, 900 cm$^{-1}$, 762 cm$^{-1}$ and 736 cm$^{-1}$.

10 g of the refined titanyl phthalocyanine obtained above is milled along with 90 g of cyclohexanone solution for two days and then 100 g of 10% polyvinyl butyral solution is added to mill for another day so as to obtain a fine dispersion of titanyl phthalocyanine. The solution is prepared after filtration.

Figure 9:
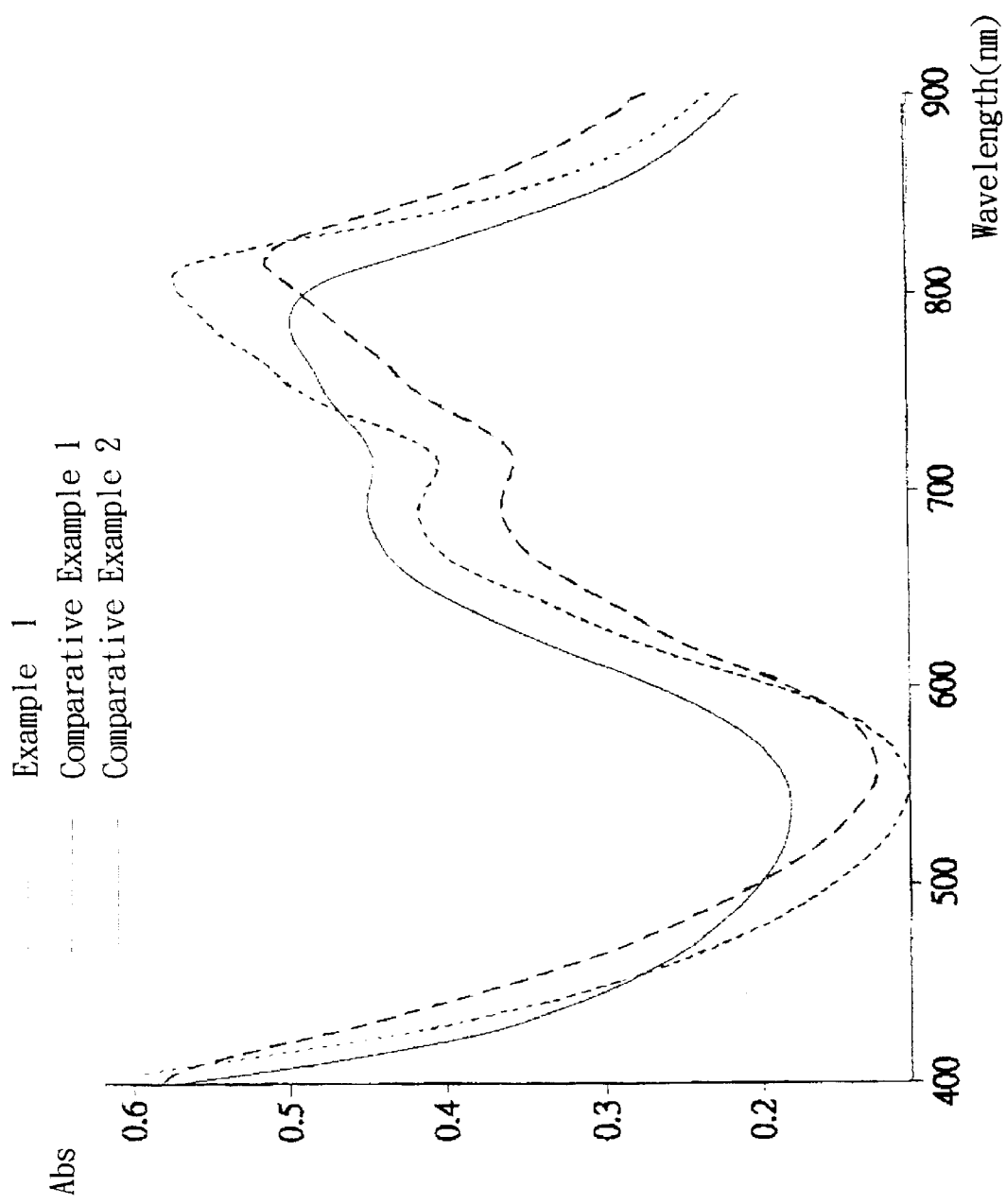
FIG. 9 is an optical absorption spectrum obtained from the refined titanyl phthalocyanine of Example 1 and the Comparative Example 1 and 2.

100 g of the prepared solution is diluted with 144 g of methylethyl ketone to attain the coating solution for the charge generation layer. Thin films of the coating solution for optical absorption measurement is shown in FIG. 9 which clearly exhibits a strong absorption peak at 780 nm.

The photoreceptor is fabricated by consecutive coating of a 1.0 .um. m copolyamide layer, a 0.2 .um. m charge generation layer containing the refined titanyl phthalocyanine, and a charge transporting layer onto the aluminum substrate. The charge transporting layer is prepared using a toluene solution of the flexible PCZ-300 polycarbonate and ST 16/1 triphenyldiamine. The thickness of the charge transporting layer is about 22 .um. m.

The electrophotographic properties of the photoreceptor is determined by the phothconductivity measuring device. The measuring steps and operation condition is as follow.

The photoresponsive imaging members of the photoreceptor is determined by electrostatically charging the surface with an arc discharge source until the surface potential, measured by a potential probe attached to a electrometer, reached an initial dark value, $V_0$, of −6.5 k volts. After resting for 2 seconds in the dark, the charged member reached a lower surface potential, $V_d$, which is called the dark development potential. The photoreceptor is subsequently exposed to the light emitted from an LED (3.5 J/cm$^2$ of energy). The exposure to the emitted light is continued for 2 seconds and a surface potential defined as the residual potential, $V_r$, is recorded. The half exposure energy, $E_{½}$ is determined by finding the amount of energy needed to reduce the $V_d$ to half of its initial value. $E_{½}$ is a value which indicates the photosensitivity of the photoreceptors. A lower $E_{½}$ indicates a higher sensitivity. The results are listed in Table 1 below.

EXAMPLE 2

In this Example, it is substituted for 250 g of anhydrous hydrogen peroxide and chlorobenzene solution prepared by Example 2 and the mole ratio of hydrogen peroxide to titanyl phthalocyanine controlled as 1:8.7. It is the same that electrophotographic properties of the photoreceptor containing the refined titanyl phthalocyanine is determined by the phothconductivity measuring device. The results are also listed in Table 1.

EXAMPLE 3

20 g of the low crystalline titanyl phthalocyanine methanol is gradually added after 300 g of chlorobenzene and 30 g of 10% hydrogen peroxide solution is added in the reactor container with divided chambers, followed by mechanically stirring and then refrigerated remaining at −10° C. in one chamber. Next, the solution is successively stirred for 6 hrs and filtered for washing by chlorobenzene and water once respectively. Finally, the titanyl phthalocyanine product is dried at 70° C. under vacuum overnight to obtain 18.5 g of refined titanyl phthalocyanine.

Figure 7:
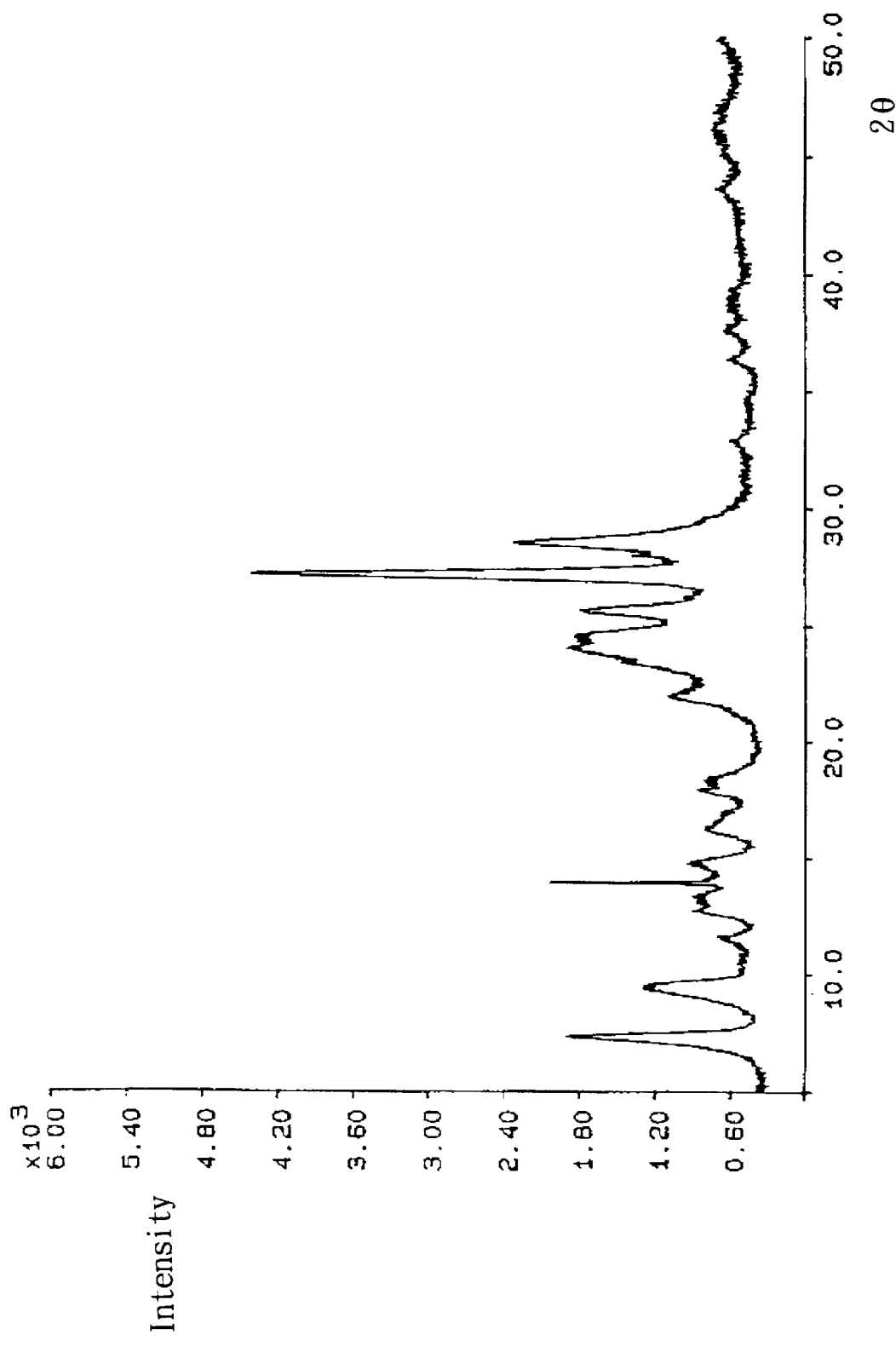
FIG. 7 is an X-ray diffraction pattern obtained from the refined titanyl phthalocyanine from Example 3.

FIG. 7 shows the X-ray diffraction pattern of the refined titanyl phthalocyanine which has Bragg diffraction angles ($2\theta\pm0.2°$) of 7.3, 9.4, 14.0, 24.1, 25.7, 27.2 and 28.5 degrees. The XRPD pattern represents a unique crystal form compared to those disclosed in the various prior art patent documents.

The refined titanyl phthalocyanine use the same procedure as mentioned above to afford the coating solution for the charge generation layer.

The photoreceptor is fabricated by consecutive coating of a 1.0 .um. m copolyamide layer, a 0.2 .um. m charge generation layer containing the refined titanyl phthalocyanine, and a charge transporting layer onto the aluminum substrate. The charge transporting layer is prepared using a toluene solution of the flexible PCZ-300 polycarbonate and ST 16/1 triphenyldiamine. The thickness of the charge transporting layer is about 22 .um. m.

It is still the same that electrophotographic properties of the photoreceptor containing the refined titanyl phthalocyanine is determined by the phothconductivity measuring device. The results are listed in Table 1.

EXAMPLE 4

In this Example, it is substituted for 30 g of 1% hydrogen peroxide solution and the 0° C. for the operation of the crystal transformation in Example 3. The results are listed in Table 1.

EXAMPLE 5

In this Example, it is substituted for 30 g of 10% hydrogen peroxide solution and the 0° C. for the operation of the crystal transformation in Example 3. The results are listed in Table 1.

COMPARATIVE EXAMPLE 1

To a 500 millimeter reactor container with divided chambers is added 250 millimeter chlorobenzene solution, followed by mechanically stirring and then refrigerated remaining at 25° C. in one chamber. Next, 20 g of the low crystalline titanyl phthalocyanine treated by methanol is gradually added, followed by successively stirring for 5 hrs, and then filtered. Finally, the titanyl phthalocyanine product is dried at 70° C. under vacuum overnight to obtain 19.5 g of modified titanyl phthalocyanine. The modified titanyl phthalocyanine uses the same procedure as mentioned in Example 1 to obtain the coating solution for the charge generation layer. Similarly, the electrophotographic properties of the fabricated photoreceptor are listed in Table 1.

COMPARATIVE EXAMPLE 2

Y form of titanyl phthalocyanine is obtained according to the method disclosed in U.S. Pat. No. 5,298,617 except that the amorphous titanyl phthalocyanine is produced by milling instead of using acid-pasting treatment. Then, 20 g of the low crystalline titanyl phthalocyanine treated by methanol is mixed with 200 g of chlorobenzene and 20 g of water at the room temperature to perform the modification of crystal forms of titanyl phthalocyanine. The modified titanyl phthalocyanine uses the same procedure as mentioned in Example 1 to obtain the coating solution for the charge generation layer. Thin films of the coating solution for optical absorption measurement is also shown in FIG. 9 which exhibits a strong absorption peak at 808 nm. Similarly, the electrophotographic properties of the fabricated photoreceptor are listed in Table 1.

COMPARATIVE EXAMPLE 3

According to the method disclosed in U.S. Pat. No. 5,567,559, 30 g of the low crystalline titanyl phthalocyanine treated by methanol is mixed saturated armnonia solution (29.8%) and 300 g of chlorobenzene at the room temperature for 5 hrs to perform the modification of crystal forms of titanyl phthalocyanine. After being dried, the modified titanyl phthalocyanine uses the same procedure as mentioned in Example 1 to obtain the coating solution for the charge generation layer. Thin films of the coating solution for optical absorption measurement is also shown in FIG. 9 which exhibits a strong absorption peak at 817 nm. Similarly, the electrophotographic properties of the fabricated photoreceptor are listed in Table 1.

TABLE 1

|  | $V_0$ (volts) | $V_r$ (volts) | $E_{½}$ (J/cm$^2$) |
|---|---|---|---|
| Example 1 | 685 | 40.1 | 0.109 |
| Example 2 | 696 | 35.4 | 0.128 |
| Example 3 | 688 | 46.2 | 0.108 |
| Example 4 | 698 | 33.6 | 0.121 |
| Example 5 | 702 | 37.3 | 0.124 |
| Comparative Example 1 | 698 | 55.0 | 0.225 |
| Comparative Example 2 | 696 | 27.16 | 0.118 |
| Comparative Example 3 | 707 | 55.7 | 0.122 |

It is noted that the present invention indeed provides a refined titanyl phthalocyanine exhibiting a good photosensitivity and having a different crystal structure, especially the refined titanyl phthalocyanine showing a higher distinct absorption peak at the wavelength of 780 nm.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A titanyl phthalocyanine having a crystal form characterized by main peaks specified by Bragg angles ($2\theta\pm0.2°$) of 7.3 degrees, 9.4 degrees, 14.0 degrees, 24.1 degrees, 25.7 degrees, 27.2 degrees and 28.5 degrees in X-ray diffraction pattern based on CuK.alpha. characteristic X-rays.

2. A titanyl phthalocyanine as recited in claim 1, which is further characterized in having vibrational absorption resonances at: 1486 cm$^{-1}$, 1420 cm$^{-1}$, 1134 cm$^{-1}$, 1078 cm$^{-1}$, 966 cm$^{-1}$, 900 cm$^{-1}$, 762 cm$^{-1}$ and 736 cm$^{-1}$ in spectra pattern based on Fourier transform infrared (FTIR) spectroscopy.

3. A method for producing titanyl phthalocyanine comprising the step of subjecting titanyl phthalocyanine to a peroxide-induced complexation-mediated crystal transformation so as to obtained a peroxide-modified titanyl phthalocyanine.

4. A method for producing titanyl phthalocyanine as recited in claim 3, further comprising:

mechanically pulverizing amorphous titanyl phthalocyanine;

obtaining a low crystalline titanyl phthalocyanine by treating said amorphous titanyl phthalocyanine with methanol;

preparing a mixture of a hydrogen peroxide solution with a organic solvent; and dispersing said low crystalline titanyl phthalocyanine in said mixture to form said peroxide-modified titanyl phthalocyanine.

5. A method for producing titanyl phthalocyanine as recited in claim 3, wherein said peroxide-modified titanyl phthalocyanine is formed at the condition of a processing temperature between −20° C. and a normal room temperature, and of processing time between 4 and 24 hours.

6. A method for producing titanyl phthalocyanine as recited in claim 5, wherein said processing temperature is preferable between −10° C. and 0° C., and said processing time is preferable between 5 and 10 hours.

7. A method for producing titanyl phthalocyanine as recited in claim 3, wherein said hydrogen peroxide solution is an anhydrous hydrogen peroxide solution.

8. A method for producing titanyl phthalocyanine as recited in claim 7, wherein said anhydrous hydrogen peroxide solution is prepared by extracting, separating and desiccating from said mixture of said hydrogen peroxide solution and said organic solvent.

9. A method for producing titanyl phthalocyanine as recited in claim 3, wherein a concentration of said hydrogen peroxide solution and said titanyl phthalocyanine are provided in a mole ratio from 1:1 to 1:100.

10. A method for producing titanyl phthalocyanine as recited in claim 9, wherein said mole ratio is preferable from 1:10 to 1:100.

11. A method for producing titanyl phthalocyanine as recited in claim 3, wherein said organic solvent and said crystalline titanyl phthalocyanine are provided in a weight ratio from 1:1 to 50:1.

12. A method for producing titanyl phthalocyanine as recited in claim 11, wherein said weight ratio is preferable from 2:1 to 10:1.

13. A method for producing titanyl phthalocyanine as recited in claim 3, wherein said organic solvent is selected from the group consisting of chlorobenzene, n-butyl ether and butane.

14. A method for producing titanyl phthalocyanine as recited in claim 3, wherein said peroxide-modified titanyl phthalocyanine is characterized by having Bragg diffraction angles of 7.3 degrees, 9.4 degrees, 14.0 degrees, 24.1 degrees, 25.7 degrees, 27.2 degrees and 28.5 degrees, and vibrational absorption resonances at 1486 $cm^{-1}$, 1420 $cm^{-1}$, 1134 $cm^{-1}$, 1078 $cm^{-1}$, 966 $cm^{-1}$, 900 $cm^{-1}$, 762 $cm^{-1}$ and 736 $cm^{-1}$.

* * * * *